Aug. 17, 1954  F. R. GROSS  2,686,335
PLASTIC EXTRUSION
Filed March 20, 1951  4 Sheets-Sheet 1
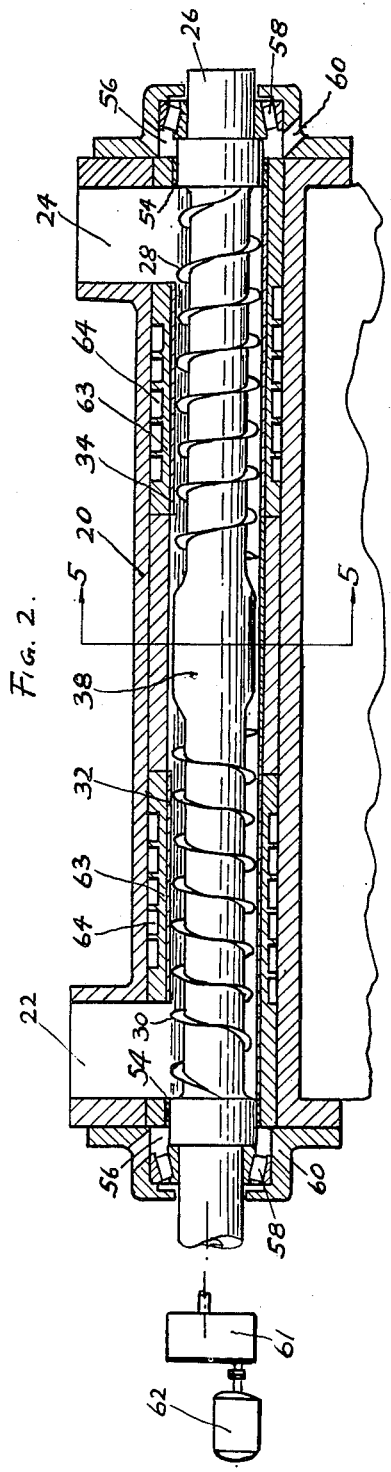
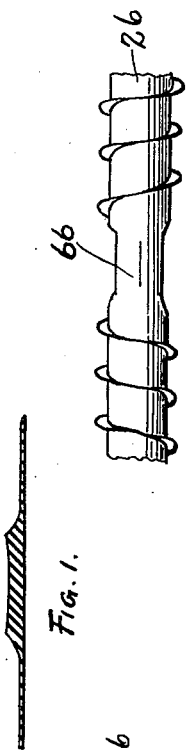
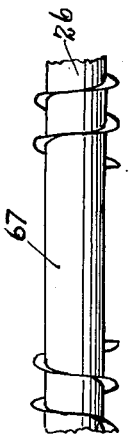
INVENTOR.
FRANK R. GROSS
BY
Christy, Parmelee and Strickland
HIS ATTORNEYS.

Aug. 17, 1954  F. R. GROSS  2,686,335
PLASTIC EXTRUSION
Filed March 20, 1951  4 Sheets-Sheet 2
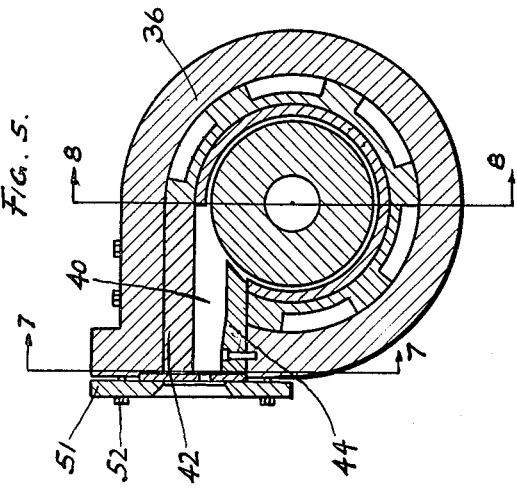
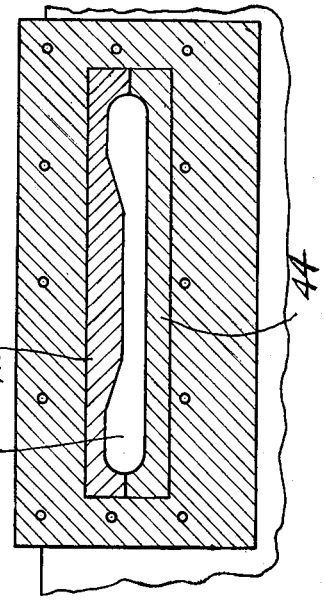
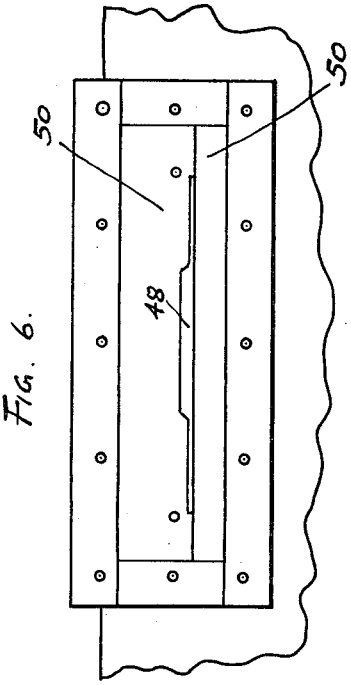
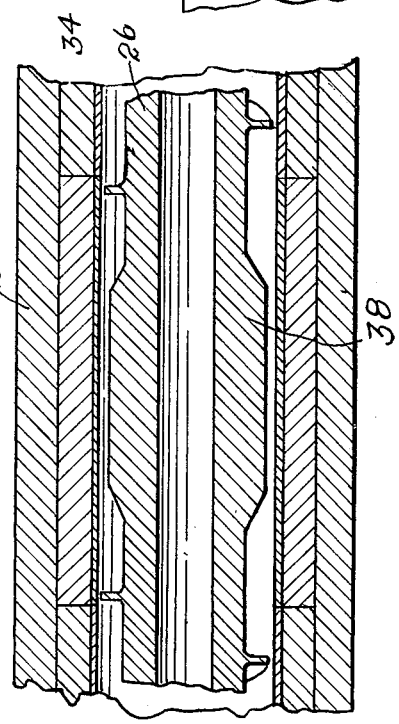
INVENTOR.
FRANK R. GROSS
BY
Christy, Parmelee and Strickland
HIS ATTORNEYS.

Aug. 17, 1954    F. R. GROSS    2,686,335
PLASTIC EXTRUSION
Filed March 20, 1951    4 Sheets-Sheet 3

INVENTOR.
FRANK R. GROSS
BY
Christy, Parmelee and Strickland
HIS ATTORNEYS.

Aug. 17, 1954 F. R. GROSS 2,686,335
PLASTIC EXTRUSION
Filed March 20, 1951 4 Sheets-Sheet 4
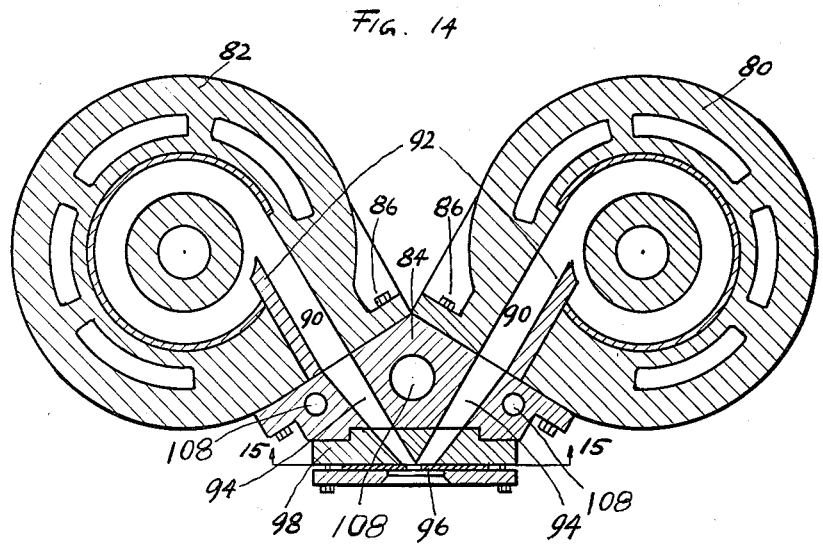
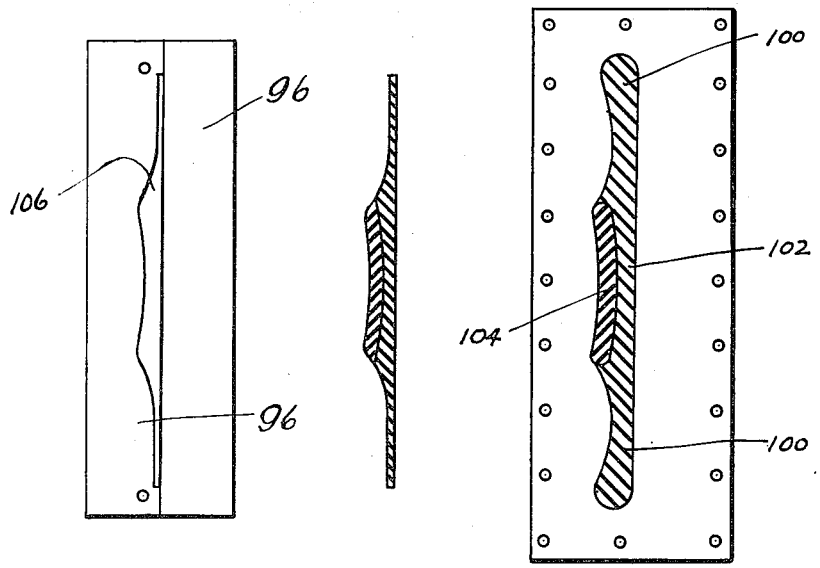
INVENTOR.
FRANK R. GROSS
BY Christy, Parmelee and Strickland
HIS ATTORNEYS.

Patented Aug. 17, 1954

2,686,335

UNITED STATES PATENT OFFICE 2,686,335

PLASTIC EXTRUSION

Frank R. Gross, Oakmont, Pa.

Application March 20, 1951, Serial No. 216,476

9 Claims. (Cl. 18—12)

This invention relates to an extrusion machine for plastics. More particularly, the invention relates to a machine for extruding rubber to be formed into a strip that is to be used to cover the carcass of an automobile tire to form the tread and side wall portions of the tire.

The rubber strip used in forming the tread and side walls of a tire carcass is a substantially symmetrical strip from about fifteen to thirty inches wide, which has a plain back surface and a thick central portion on the front surface from which extends two comparatively thin wing portions to form the side walls of the tire. The tire strips are usually formed by extrusion and a higher pressure must be applied at the sides of the die which form the wings, in order to force the rubber through the narrow slots of the die which form the wing portions. The different pressures used in forming the different sections of the strip set up different stresses in the tread and wing portions of the strip, so that when the hot extruded strip is cut off from the continuous strip and allowed to cool and shrink, the wing portions contract more than the central tread portion, and consequently the wing portions have to be stretched and fixed in position when the strip is applied to a tire carcass preparatory for vulcanization. Sometimes the strips become so irregularly shaped after shrinking that the strips have to be recut, which requires added labor expense in making a tire, and often results in the formation of imperfect side walls on the tires.

The primary object of the present invention is to provide a plastic extrusion machine by which the plastic may be worked under improved flow conditions with a minimum temperature rise while extruding a product of more uniform composition.

Another object of the invention is to provide the plastic extrusion machine in which the plastic may be worked with a minimum of horse power work expended and obtain the proper temperature conditions through the extruding machine without danger of over-curing the product or adversely affecting its vulcanizing properties.

A further object of the invention is to provide a plastic extrusion machine by which a wide strip having relatively thin and thick sections may be formed, which will cool and shrink so that all of the sections of the strip will have substantially a uniform length.

A still further object of the invention is to provide a rubber extrusion machine by which a strip for forming the tread and side wall surfaces of an automobile tire may be extruded and cooled, and have the side wall sections of the strip of the same length as the tread section.

With these and other objects in view, the invention consists in the plastic extrusion machine as hereinafter described and particularly defined in the claims.

The various features of the invention are illustrated in the accompanying drawings, in which:

Fig. 1 is a sectional view of a rubber strip of the type used in covering the carcass of an automobile tire for the manufacture of which the machine of the present invention is specifically designed;

Fig. 2 is a vertical sectional view of the plastic working and feeding rolls of an extrusion machine showing the preferred form of the invention;

Fig. 3 is a fragmentary view in elevation of the central portion of a modified form of the working roll of the type shown in Fig. 2;

Fig. 4 is a fragmentary view of the central portion of the working roll which is a modification of the roll shown in Fig. 2;

Fig. 5 is a vertical sectional view of the extruding machine taken on the line 5—5 of Fig. 2;

Fig. 6 is a view in elevation of the front of the extrusion head of the machine showing the extrusion die;

Fig. 7 is a view in vertical section of the extrusion head taken on the line 7—7 of Fig. 5;

Fig. 8 is a vertical sectional view of an extrusion head taken on the line 8—8 of Fig. 5;

Figure 9:
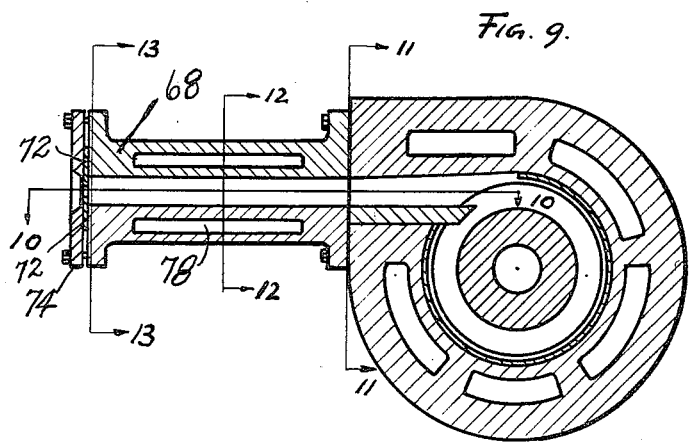
Fig. 9 is a vertical sectional view of a modified form of extrusion head having an elongated extrusion throat, which is taken on the line 9—9 of Fig. 10.
Figure 11:
Figure 12:
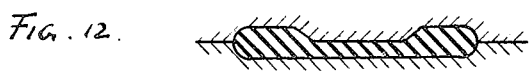
Figure 13:

Figs. 11, 12 and 13 are vertical sections of rubber-filled extrusion cavities in the extrusion head of Fig. 9, taken respectively on the lines 11—11, 12—12 and 13—13;

Fig. 14 is a vertical sectional view of a double extrusion head for forming a tire strip made of two kinds of rubber for the tread surface;

Fig. 15 is a view in front elevation taken on the line 15—15 of Fig. 14, showing the shape of the nozzle outlet of the two extrusion heads;

Fig. 16 is a front view of the die for the double extrusion head of Fig. 14; and Fig. 17 is a vertical sectional view of a rubber strip formed with the extrusion head of Fig. 14.

The invention illustrated in the drawings is an extrusion machine designed particularly for making the rubber strips used in covering the carcass of an automobile tire. This strip has a comparatively thick central portion of the tire tread, and comparatively thin wing side portions to form the side walls of the tire. The machine is designed particularly to force rubber through a die to extrude the strip and have the stresses in the rubber as it emerges from the die in such a condition that when the strip is cut off into tire sections and cooled, the strip will cool and contract to have the wing portions of substantially the same length as the tread portion.

Referring to Figs. 2 and 5, the machine consists of a working barrel 20 having feed openings 22 and 24 at its opposite ends. In the central portion of the barrel is mounted a working and extrusion roll 26. The roll 26 has screw flights 28 and 30 formed on its outer surface which move in close proximity to liners 32 and 34 mounted within the barrel. The screw flights 28 and 30 are opposed spirals, so that rubber which enters at the openings 22 and 24 will simultaneously move toward a central portion of the roll which discharges into an extrusion head 36 (Fig. 5). The central portion of the roll 26 is enlarged in the section 38 to restrict the flow of rubber entering the central section of throat 40 formed in the head above the roll. The throat 40 is formed between a die plate 42 and a cutter or knife plate 44. The knife plate is positioned in the throat to sever a strip of rubber from the roll to enter the throat 40, the remaining rubber adhering to the roll.

The cross section of the throat at the mouth thereof is shown at 46 in Fig. 7. It will be noted that the upper die plate 42 (Fig. 5) is shaped so that the cross sectional area of the throat section 46 is larger opposite the wing portions of the strip than is the cross-sectional area of the section of the throat opposite the tread portion of the strip. This configuration of the throat allows the rubber to flow through the throat with less resistance opposite the wing portions than opposite the tread portions. In this way the rubber, when issuing through a die opening 48 in die plates 50 (Fig. 6) mounted at the mouth of the throat, will provide the thin wing sections of the strip which have substantially the same stresses set up therein as are set up in the tread portion of the strip. Therefore, when the strip is severed from the continuous strip being extruded, the severed portion will cool and shrink substantially uniformly throughout the width of the section. The die plates 50 are held in position on front of the extrusion head by means of a back-up plate 51 which is held in position by screws 52. The knife plate 44 is adjustable in the throat, so that the size of the strip being severed from the rubber surrounding the roll may be gauged to help control the stresses being set up in the rubber strip. The knife 44 may consist of a single adjustable blade or a series of blades which may be independently adjustable to assist in forming a strip of the desired thickness.

Liners 32 and 34 (Fig. 2) are mounted within the barrel to surround the screw flights for the purpose of taking the wear in working the rubber. These liners are readily removable so that they may be replaced if the wear requires a change. Bushings 54 are mounted at the ends of the roll 26 to avoid movement of rubber from the openings 22 and 24 out into a cavity 56 containing roller thrust bearings 58. If any rubber passes the liners 54, this rubber can escape through openings 60 to prevent the rubber from penetrating into the thrust bearings. Normally the lefthand end of the roll 26 will be connected by a speed reducer 61 geared to a motor 62 for operating the roll. The roll 26 has a central opening therein by which steam or heating or cooling water may be circulated therethrough to help control the temperature of the rubber being worked.

Temperature control liners 63 are mounted outside of the liners 32 in the section of the barrel over the screw flights 28 and 30. These liners are provided with helical openings 64 through which heating or cooling liquid may be circulated to help control the temperature of the rubber or plastic being worked in the barrel.

As shown in Fig. 2, the central portion of the roll 26 between the helical screw flights is enlarged at 38 to force rubber to the side wing portions of the throat leading to the extrusion die. While this application is directed particularly to the production of automobile tire strips, it is apparent that the same machine may be useful for extruding strips of many of the different types of plastic, particularly thermal plastics.

In Fig. 3 is shown a form of extruding roll in which the central section 66 is contracted between the helical screws for the purpose of concentrating the plastic in the central portion of the extrusion head.

In Fig. 4 a section 67 of an extruding roll is shown, in which the diameter of the central portion of the roll is substantially equal to the diameter of the roll at the base of the helical screw. This type of roll will assist in distributing the plastic uniformly over substantially the entire width of the nozzle of the extruding head, in order to work with a specific form of die.

Figure 10:
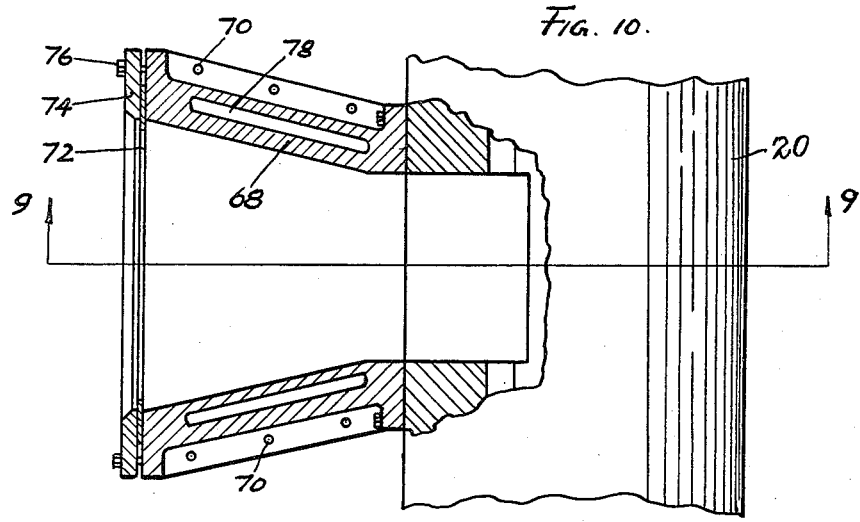
Fig. 10 is a horizontal sectional view of the extrusion throat taken on the line 10—10 of Fig. 9.

In Figs. 9 and 10 are shown a modified form of extrusion head which differs from the extrusion head shown in Fig. 5, in that an elongated throat 68 is attached to the front end of the head in order to provide a section in which the throat for shaping the plastic flowing therethrough may be advantageously handled in order to develop the proper stress in the extruded strip passing through the die. The throat portion 68 is made of upper and lower sections that are bolted together by bolts 70, which allow access to the interior of the throat for the purpose of making it in any desired shape. A die set 72 is attached to the outer end of the throat by means of a back-up plate 74 and bolts 76. A passage 78 is formed around the outer surface of the throat 68 through which temperature control fluids may be circulated to control the flow of fluid through the throat.

In Figs. 11, 12 and 13 are shown rubber-filled sections of the throat to obtain the proper distribution of the plastic to condition it for passing through the die in the plate 72.

In Fig. 14 is shown a modified form of extruding machine for making tire tread strips in which the tread portion of the strip is made of a different type of rubber than the wing portions of the strip. To make this type of tire strip, two extruding barrels 80 and 82 are mounted side by side and connected together by means of a head 84. The barrels 80 and 82 have the same construction as the barrel 20 with feed openings at each end and working rolls having helical screws thereon similar to parts 26, 28 and 30. The head 84 is connected to the central portion of the barrels 80 and 82 by means of bolts 86 and 88. The throat portion 90 is formed in each head in position to receive adjustable knives 92 for severing a strip of rubber from the roll in the barrel. The severed strip passes through the throats 90 into a special throat 94, which distributes the rubber for proper flow through a die set 96 mounted in the front of the head 84. A die block 98 is mounted in front of the head 84 immediately behind the plate set 96, and a special configuration is given to the throat portion in the block which communicates with the different barrels 80 and 82. The outlet of the throat for the barrel 80 is shown in Fig. 15 as 100, in which the wing portions have a greater cross sectional area than the central tread portion 102. The configuration of the throat for the barrel 82 is shown as 104 immediately above the portion 102 of the throat in the barrel 80. The shape of the die opening 106 in the plate set 96 is shown in Fig. 16. Therefore rubber in the shape shown in Fig. 15 issues through the die opening 106 illustrated in Fig. 16 to form the tire section illustrated in Fig. 17. These two strips maintain their shape as they issue from the die opening and become united to form an integral strip.

To assist in giving the proper shape to the throats 94 in the head 84, the head may be made in three parts with a division line at one side of each throat 94. Further openings 108 are formed in each portion of the head 84 to provide for the circulation of a temperature control fluid therethrough to control the flow conditions of rubber through the head.

With the exception of the parts which have been described above, the construction or mode of operation of each of the extruding rolls and barrels used for making each individual portion of the tire strip of the machine illustrated in Fig. 14 is the same as that illustrated and described with reference to Figs. 2 and 5.

The preferred form of the invention having thus been described, what is claimed as new is:

1. An extrusion press for forming a strip of plastic from about fifteen to thirty inches wide having a comparatively thick central portion and thin wing portions at each side of the central portion, comprising a plastic conditioning and extruding barrel of uniform diameter throughout having a feed opening at each end thereof and a plastic distributing outlet at the central portion thereof, a roll rotatably mounted in the barrel having a diameter which will fill the major portion of the barrel, screw flights on the roll extending from the roll surface to the inner wall of the barrel and located from the feed openings to the central plastic distributing outlet portion of the barrel, a throat member extending tangentially from the outer periphery of the central portion of the barrel at right angles to the axis of the barrel and having a passageway to direct the plastic away from the said outlet, a die mounted at the outlet end of the passageway of the throat member and having an extrusion opening designed to form said plastic strip, said screw flights being shaped to advance the plastic from the feed openings to the central portion of the barrel and through the passageway in the throat member to the die, the passageway having a cross-sectional flow area in front of the central portion of the die which is smaller than the cross-sectional flow area of the central portion of the die opening and a cross-sectional flow area in front of the wing portions of the die which is larger than the cross-sectional flow area of the wing portions of the die opening, and means to operate the roll to extrude plastic through the die.

2. The extrusion press defined in claim 1 in which the screw flights terminate short of the central portion of the roll, the diameter of the central portion being increased to work the plastic to the sides of the throat passage.

3. The extrusion press defined in claim 1 in which a knife is mounted in the throat with its cutting edge spaced from the roll to sever a strip of plastic from the material moving with the central portion of the roll and directing the strip into the throat.

4. The extrusion press defined in claim 3 in which the strip forming knife is adjustable to vary the size of strip to pass into the extrusion throat.

5. An extrusion press for forming a strip of plastic having a comparatively thick central portion and a thin wing portion at each side of the central portion, comprising a plastic conditioning and extruding barrel having a feed opening at each end thereof and a plastic distributing outlet at the central portion thereof, a roll rotatably mounted in the barrel and having a diameter which will fill the major portion of the barrel, screw flights on the roll extending from the periphery of the roll to the inner wall of the barrel and located from the feed openings to the central portion of the barrel, a throat member extending tangentially from the outer periphery of the central plastic distributing portion of the barrel at right angles to the axis of the barrel and having a passageway to direct the plastic away from the said central portion, a die mounted at the outlet end of the throat member and having an extrusion opening designed to form said plastic strip, said screw flights being shaped to advance plastic from the feed openings to the central portion of the barrel and into the passageway in the throat member, the throat passageway having approximately a uniform depth extending from the barrel to the die and having its greatest cross-sectional flow area positioned in front of the narrow portions of the die opening to provide a greater supply of plastic to the more restricted portions of the die opening so as to completely form the thin wing portions of the strip and reduce the stresses in the wing portions to prevent wrinkling thereof.

6. The extrusion press defined in claim 5 in which the die has a comparatively wide central opening and comparatively narrow wing openings at each side of the central opening to form a strip for use in making the tread and side wall sections on the carcass of an auto tire, and the throat passage terminating at the die is shaped to have a depth several times the depth of the wing forming opening of the die and a central depth narrower than the depth of the tread-forming opening of the die.

7. The extrusion press defined in claim 1 in which the screw flights terminate a short distance from the center of the roll and the section of the roll between the inner ends of the flights is cylindrical with a diameter substantially equal to the diameter of the roll at the base of the flights.

8. The extrusion press defined in claim 1 in which the radius of the central portion of the roll between the inner ends of the flight is increased by the depth of the flight.

9. The extrusion press defined in claim 1 in which the diameter of the central portion of the roll between the inner ends of the flights is substantially decreased from the roll diameter in the flight area.

References Cited in the file of this patent

UNITED STATES PATENTS

| Number | Name | Date |
|---|---|---|
| 2,367,394 | Griffiths | Jan. 16, 1945 |
| 2,444,831 | Kilborn | July 6, 1948 |
| 2,485,854 | Zona | Oct. 25, 1949 |
| 2,519,834 | Hanson et al. | Aug. 22, 1950 |

FOREIGN PATENTS

| Number | Country | Date |
|---|---|---|
| 150,754 | Great Britain | Sept. 16, 1920 |
| 409,577 | Germany | Feb. 7, 1925 |